US009332463B2

(12) United States Patent
Hirano et al.

(10) Patent No.: US 9,332,463 B2
(45) Date of Patent: *May 3, 2016

(54) SENSING RF ENVIRONMENT TO DETERMINE GEOGRAPHIC LOCATION OF CELLULAR BASE STATION (71) Applicant: Broadcom Corporation, Irvine, CA (US)

(72) Inventors: Mike Hirano, Redmond, WA (US); M. Sue McMeekin, Snohomish, WA (US); Ahmed Tariq, Port Coquitlam (CA)

(73) Assignee: Broadcom Corporation, Irvine, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 14/097,692

(22) Filed: Dec. 5, 2013

(65) Prior Publication Data

US 2014/0135017 A1 May 15, 2014

Related U.S. Application Data (63) Continuation of application No. 11/645,121, filed on Dec. 21, 2006, now Pat. No. 8,620,342.

(51) Int. Cl.
*H04W 36/00* (2009.01)
*H04W 64/00* (2009.01)
*H04W 24/02* (2009.01)
*H04W 4/02* (2009.01)

(52) U.S. Cl.
CPC .......... *H04W 36/0061* (2013.01); *H04W 24/02* (2013.01); *H04W 64/003* (2013.01); *H04W 4/02* (2013.01)

(58) Field of Classification Search
CPC ..... H04W 64/00; H04W 4/02; H04W 64/003; H04W 24/02; H04W 36/0061
See application file for complete search history.

(56) References Cited

U.S. PATENT DOCUMENTS

| | | | |
|---|---|---|---|
| 5,212,684 A | 5/1993 | MacNamee et al. |
| 5,212,831 A | 5/1993 | Chuang et al. |
| 5,535,259 A | 7/1996 | Dent et al. |
| 5,822,698 A | 10/1998 | Tang et al. |
| 6,028,853 A | 2/2000 | Haartsen |
| 6,104,922 A | 8/2000 | Baumann |

(Continued)

OTHER PUBLICATIONS

Cheng, M.M.L., and Chuang, J.C.I., "Distributed Measurement-based Quasi-fixed Frequency Assignment for Personal Communications," IEEE, Feb. 1995, pp. 433-437.

(Continued)

*Primary Examiner* — Ajit Patel
(74) *Attorney, Agent, or Firm* — Sterne, Kessler, Goldstein & Fox P.L.L.C.

(57) ABSTRACT

Determining a geographic location of a cellular base station is disclosed. In some embodiments, a set of measurement data that includes for each of a plurality of signals received at the base station a corresponding measurement data is determined. The set of measurement data is used to determine the geographic location of the base station. In some embodiments, a set of measurement data is received. The received measurement data includes for each of a plurality of location measurement units at which a signal transmitted by the base station is received a corresponding measurement data associated with the signal. The set of measurement data is used to determine the geographic location of the base station.

28 Claims, 8 Drawing Sheets

(56) References Cited

U.S. PATENT DOCUMENTS

| | | | |
|---|---|---|---|
| 6,223,031 | B1 | 4/2001 | Naslund |
| 6,285,874 | B1 | 9/2001 | Magnusson et al. |
| 6,351,643 | B1 | 2/2002 | Haartsen |
| 6,405,048 | B1 | 6/2002 | Haartsen |
| 6,647,000 | B1 | 11/2003 | Persson et al. |
| 6,810,252 | B1 | 10/2004 | Kwon |
| 6,888,817 | B1 | 5/2005 | Shyy et al. |
| 6,950,667 | B2 | 9/2005 | Roy et al. |
| 6,999,725 | B2 | 2/2006 | Nitta et al. |
| 7,280,831 | B2 * | 10/2007 | Moilanen et al. ............ 455/436 |
| 7,324,813 | B2 | 1/2008 | Mountney et al. |
| 7,356,389 | B2 | 4/2008 | Holst et al. |
| 7,498,984 | B2 | 3/2009 | Taniguchi |
| 7,944,823 | B1 | 5/2011 | Bordonaro et al. |
| 8,155,680 | B2 | 4/2012 | Hirano et al. |
| 8,280,366 | B2 | 10/2012 | Hirano et al. |
| 2001/0019957 | A1 | 9/2001 | Kusaki et al. |
| 2002/0102994 | A1* | 8/2002 | Tuutijarvi ............... 455/456 |
| 2002/0111163 | A1 | 8/2002 | Hamabe |
| 2002/0196781 | A1 | 12/2002 | Salovuori |
| 2003/0003874 | A1 | 1/2003 | Nitta et al. |
| 2003/0040323 | A1* | 2/2003 | Pihl et al. ............... 455/456 |
| 2003/0054838 | A1 | 3/2003 | Carrez |
| 2003/0058976 | A1 | 3/2003 | Ohta et al. |
| 2003/0069030 | A1 | 4/2003 | Mukherjee |
| 2003/0190919 | A1* | 10/2003 | Niemenmaa ............ 455/456.1 |
| 2003/0220102 | A1 | 11/2003 | Kallio |
| 2004/0023671 | A1* | 2/2004 | Rudolf et al. ............ 455/456.5 |
| 2004/0116133 | A1 | 6/2004 | Kalhan et al. |
| 2004/0132464 | A1 | 7/2004 | Poykko et al. |
| 2004/0152478 | A1 | 8/2004 | Ruohonen et al. |
| 2004/0204097 | A1 | 10/2004 | Scheinert et al. |
| 2004/0233889 | A1 | 11/2004 | Fujita et al. |
| 2005/0030935 | A1 | 2/2005 | Seisenberger et al. |
| 2005/0130644 | A1 | 6/2005 | Bassompierre et al. |
| 2005/0136938 | A1* | 6/2005 | Kang .................. 455/452.2 |
| 2005/0148368 | A1 | 7/2005 | Scheinert et al. |
| 2005/0207334 | A1 | 9/2005 | Hadad |
| 2005/0219000 | A1 | 10/2005 | Wu |
| 2005/0226152 | A1 | 10/2005 | Stephens et al. |
| 2005/0255890 | A1 | 11/2005 | Nakada |
| 2006/0009191 | A1 | 1/2006 | Malone, III |
| 2006/0009210 | A1 | 1/2006 | Rinne et al. |
| 2006/0019701 | A1 | 1/2006 | Ji |
| 2006/0088023 | A1 | 4/2006 | Muller |
| 2006/0121916 | A1 | 6/2006 | Aborn et al. |
| 2006/0211431 | A1 | 9/2006 | Mansour et al. |
| 2007/0021122 | A1 | 1/2007 | Lane et al. |
| 2007/0097939 | A1 | 5/2007 | Nylander et al. |
| 2007/0111737 | A1 | 5/2007 | Swope et al. |
| 2007/0150565 | A1 | 6/2007 | Ayyagari et al. |
| 2008/0002658 | A1 | 1/2008 | Soliman |
| 2008/0085699 | A1 | 4/2008 | Hirano et al. |
| 2008/0085720 | A1 | 4/2008 | Hirano et al. |

OTHER PUBLICATIONS

International Preliminary Report on Patentability directed to related International Application No. PCT/US07/21358, mailed on Apr. 15, 2009; 5 pages.

International Search Report directed to related International Application No. PCT/US07/21358, mailed on Mar. 13, 2008; 1 page.

Non-Final Rejection mailed Jul. 2, 2013 for U.S. Appl. No. 11/645,113, filed Dec. 21, 2006; 12 pages.

Non-Final Rejection mailed May 25, 2011 for U.S. Appl. No. 11/645,113, filed Dec. 21, 2006; 16 pages.

Non-Final Rejection mailed Jan. 20, 2010 for U.S. Appl. No. 11/645,113, filed Dec. 21, 2006; 13 pages.

Final Rejection mailed Feb. 16, 2012 for U.S. Appl. No. 11/645,113, filed Dec. 21, 2006; 23 pages.

Final Rejection mailed Jul. 8, 2010 for U.S. Appl. No. 11/645,113, filed Dec. 21, 2006; 19 pages.

European Search Report directed to related European Patent Application No. 07852542.5-1854, mailed May 22, 2013; 8 pages.

International Search Report directed to related International Application No. PCT/US07/21463, mailed on Apr. 2, 2008; 1 page.

International Preliminary Report on Patentability directed to related International Application No. PCT/US07/21463. mailed on Apr. 15, 2009; 6 pages.

Inteational Search Report directed to related International Application No. PCT/US071021462. mailed on Mar. 13, 2008; 1 page.

International Search Report directed to related International Application No. PCT/US07/21591, mailed on Mar. 18, 2008; 2 pages.

International Preliminary Report on Patentability directed to related International Application No. PCT/US07/21591, mailed on Apr. 15, 2009; 5 pages.

Non-Final Rejection mailed Jul. 22, 2009 for U.S. Appl. No. 11/645,157, filed Dec. 21, 2006; 16 pages.

Final Rejection mailed Sep. 2, 2010 for U.S. Appl. No. 11/645,157, filed Dec. 21, 2006; 15 pages.

Non-Final Rejection mailed Feb. 17, 2010 for U.S. Appl. No. 11/645,157, filed Dec. 21, 2006; 13 pages.

Non-Final Rejection mailed Feb. 18, 2011 for U.S. Appl. No. 11/645,157, filed Dec. 21, 2006; 18 pages.

Final Rejection mailed Oct. 27, 2011 for U.S. Appl. No. 11/645,157, filed Dec. 21, 2006; 17 pages.

Non-Final Rejection mailed Mar. 20, 2012 for U.S. Appl. No. 11/645,157, filed Dec. 21, 2006; 22 pages.

Notice of Allowance mailed Jun. 7, 2012 for U.S. Appl. No. 11/645,157. filed Dec. 21, 2006; 16 pages.

Non-Final Rejection mailed Mar. 29, 2010 for U.S. Appl. No. 11/645,118, filed Dec. 21, 2006; 12 pages.

Final Rejection mailed Sep. 10. 2010 for U.S. Appl. No. 11/645,118, filed Dec. 21, 2006; 14 pages.

Non-Final Rejection mailed Mar. 1, 2011 for U.S. Appl. No. 11/645,118, filed Dec. 21, 2006; 18 pages.

Notice of Allowance mailed Oct. 25, 2011 for U.S. Appl. No. 11/645,118, filed Dec. 21, 2006; 14 pages.

Notice of Allowance mailed Aug. 29, 2013 for U.S. Appl. No. 11/645,121, filed Dec. 21, 2006; 12 pages.

* cited by examiner

SENSING RF ENVIRONMENT TO DETERMINE GEOGRAPHIC LOCATION OF CELLULAR BASE STATION

CROSS REFERENCE TO RELATED APPLICATIONS

This application is a continuation of U.S. patent application Ser. No. 11/645,121 filed Dec. 21, 2006, now allowed, which claims priority to U.S. Provisional Patent Application No. 60/850,872 entitled "Method of RF Monitoring," filed Oct. 10, 2006. Each of the above applications is hereby incorporated herein by reference in its entirety.

BACKGROUND OF THE INVENTION

In a traditional mobile telecommunication network, mobile stations (e.g., mobile phones) communicate via an air link with a stationary base transceiver station (BTS), typically a tower or other structure with one or more antennas and associated radio transceivers. A traditional BTS typically relays data between mobile stations and the core mobile network via a dedicated communication link to a base station controller (BSC). However, smaller base transceiver stations have been developed, e.g., for personal use in the home, dedicated use by a small business or other enterprise, dedicated or additional coverage for areas with high user density or demand (such as airports), etc. Such smaller base transceiver stations are sometimes referred to herein and in the industry by a variety of terms, depending on their size and configuration, including without limitation by terms such as "micro-BTS", "pico-BTS", and "femto-BTS", which terms distinguish such smaller scale installations from a traditional "BTS", which is sometimes referred to as a "macro-BTS" deployed to serve an associated "macro-cell". Deployment of such smaller base transceiver stations poses challenges to mobile telecommunications network operators and equipment providers, including the need to know that a deployed small scale BTS has not been moved without authorization to a location in which the small scale BTS is not authorized to operate.

In addition, certain regulatory and/or service requirements, such as emergency 911 (E911) regulations that require mobile telecommunications providers to be able to provide to authorities the location from which a call from a mobile phone is being and/or was made, require that the location of the base station be known.

Therefore, there is a need for a way for a mobile network and/or service provider to determine the geographic location of a small scale or otherwise potentially movable base station or other network equipment.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Sensing an RF environment to determine the geographic location of a mobile telecommunications network asset, such as a small scale base station, is disclosed. In some embodiments, a small scale base station, such as a micro-, pico-, or femto-BTS, includes an RF sensing or "sniffing" subsystem that enables the base station to sense the RF environment in a location in which the base station is located. In some embodiments, signals broadcast from sources the location of which is known are sensed by the small scale base station or other potentially movable equipment, and triangulation and/or similar techniques are used to determine the geographic location of the base station or other equipment. In some embodiments, beacon or other signals broadcast by adjacent macro-cells (macro-BTS's) are sensed and used to determine the geographic location of the small scale base station or other equipment.

Figure 1:
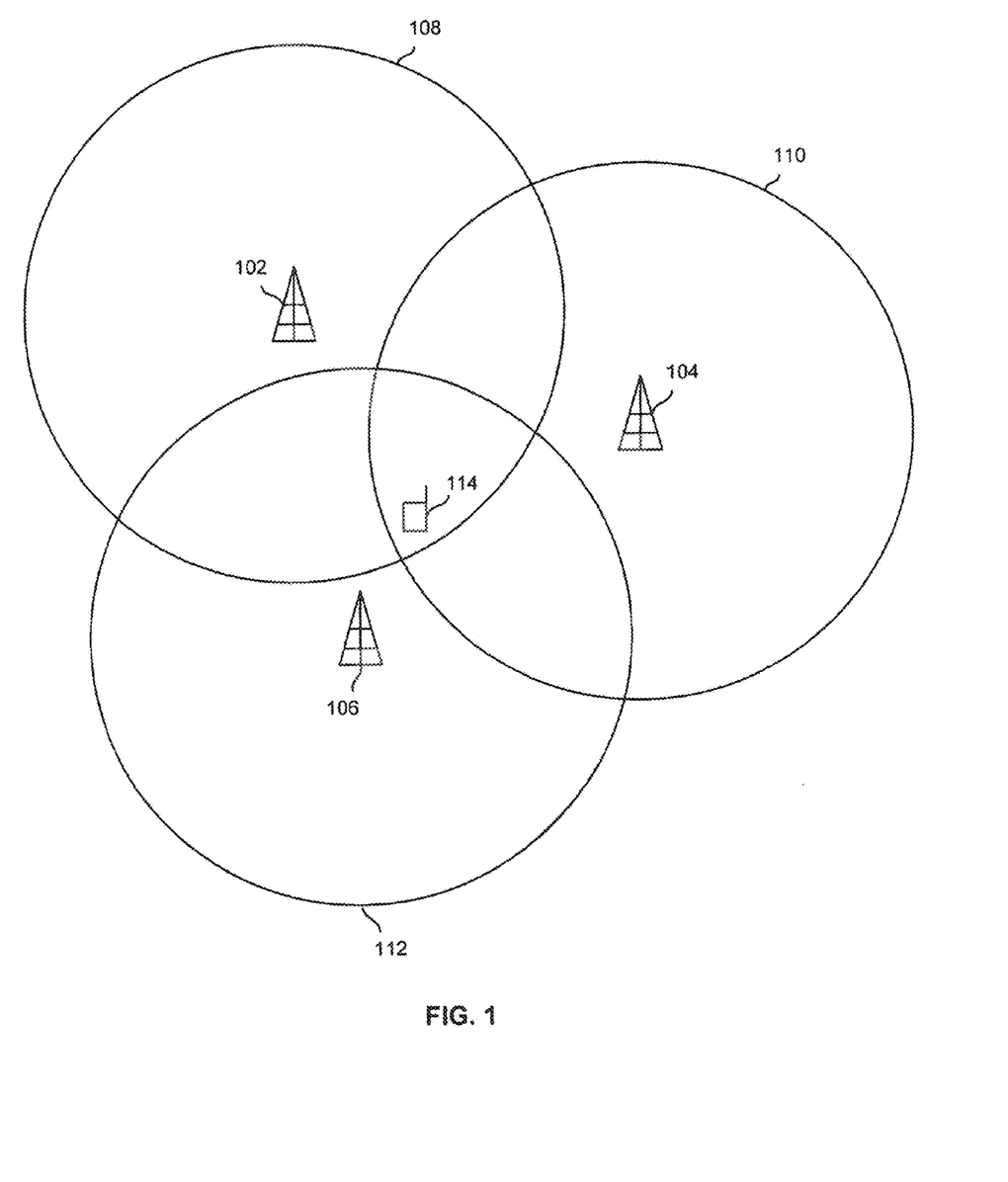
FIG. 1 is a block diagram illustrating an embodiment of a portion of a macrocellular network.

FIG. 1 is a block diagram illustrating an embodiment of a portion of a macrocellular network. In the example shown, each of the base transceiver stations (BTS) 102, 104, and 106 has associated with it a corresponding geographic coverage area 108, 110, and 112, respectively, within which its signal is strong enough to be received and used by a mobile station (MS) to communicate with the core mobile telecommunication network via that BTS. In areas in which two or more coverage areas overlap. an MS could in theory communicate with the core mobile network via any BTS having coverage in that area. In the example shown, a mobile station (MS) 114 is located in a region in which the coverage areas 108, 110, and 112 overlap.

Figure 2:
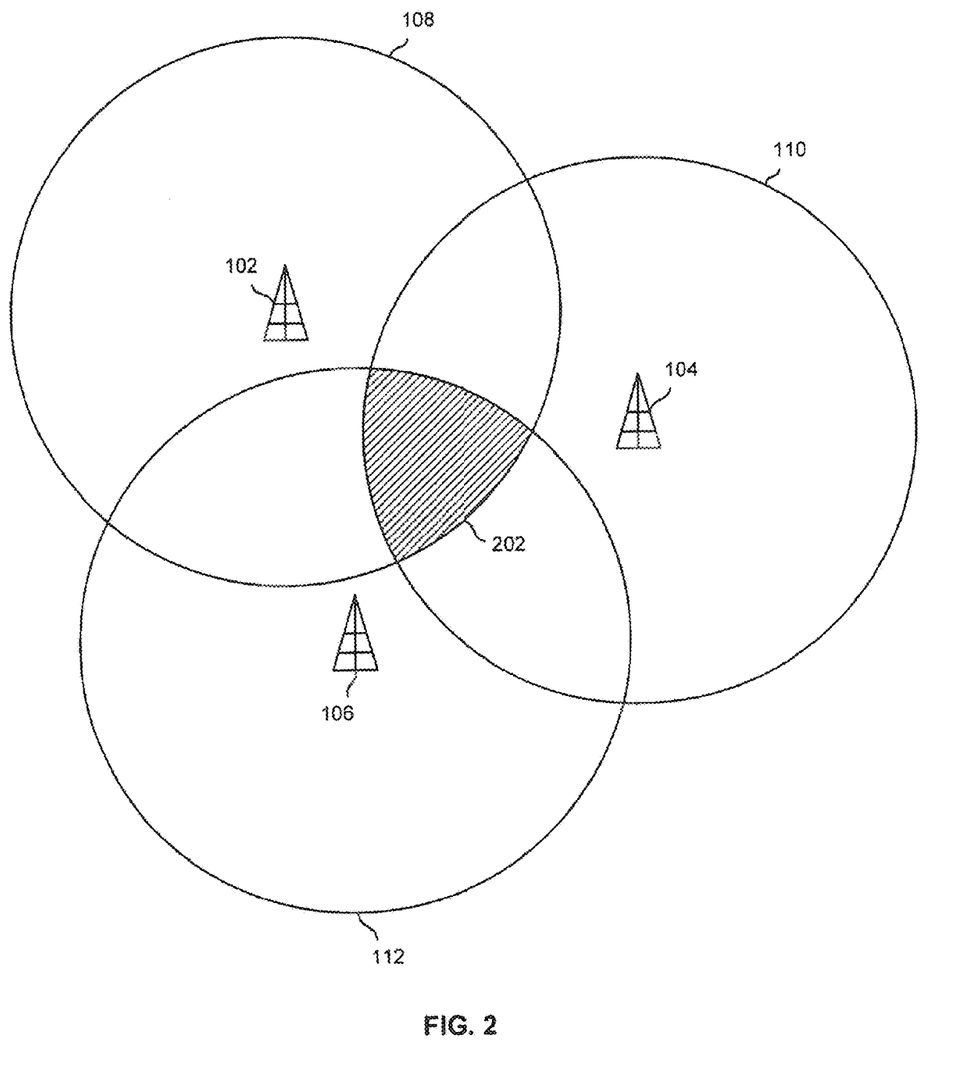
FIG. 2 highlights the region of overlap of the coverage areas shown in FIG. 1.

FIG. 2 highlights the region of overlap of the coverage areas shown in FIG. 1. The geographic location of the MS 114 can be determined to a first order by concluding from the fact that the MS 114 is receiving the respective beacon or other broadcast signal being transmitted by BTS's 102, 104, and 106 that the MS 114 is located somewhere in the region 202 in which the coverage areas 108, 110, and 112 overlap. In some embodiments, the above approach is extended to potentially movable network elements, such as a small scale base station. In some embodiments, a small scale base station senses the local RF environment. The general geographic location of the base station is determined by finding the region(s) in which the coverage areas of the respective macro-BTS's from which the small scale base station or other network equipment is receiving the beacon or other broadcast signal overlap.

Figure 3:
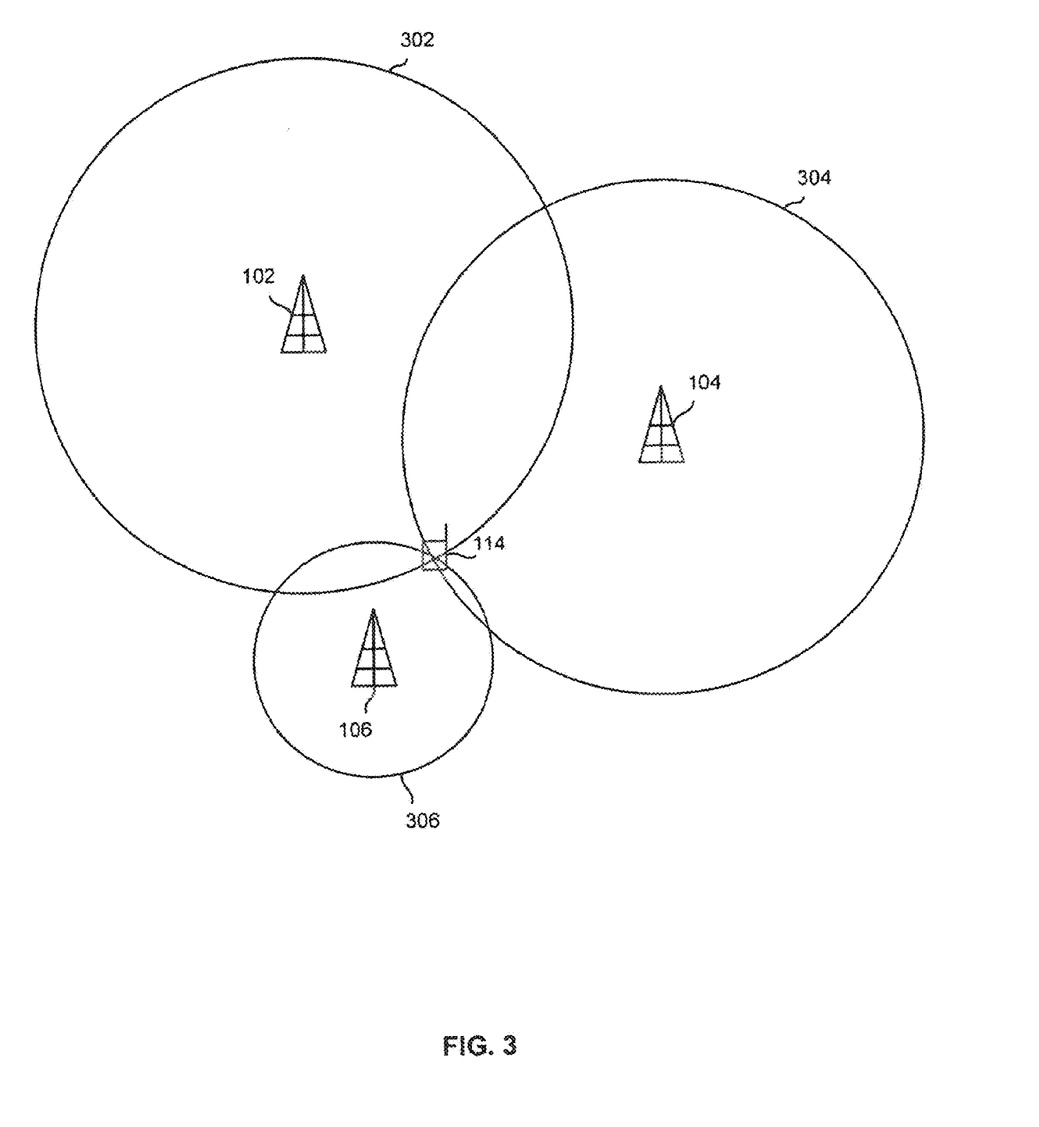
FIG. 3 is a block diagram illustrating an embodiment of a prior art circular lateration approach used to determine the geographic location of a mobile station.

FIG. 3 is a block diagram illustrating an embodiment of a prior art circular lateration approach used to determine the geographic location of a mobile station. In the example shown, the more precise geographic location of the MS 114 is determined by calculating the distance of the MS from each of the adjacent macro-BTS's 102, 104, and 106. Using a technique known as Enhanced Observed Time Difference (E-OTD), for example, the difference between a time at which the MS receives the respective signal burst from each of two (or more) pairs of macro-BTSs and the real time difference (RTD) that represents the time offset between emissions of the respective signal bursts from the BTS's are used to determine the geographic location of the MS.

E-OTD can be performed in a couple of ways: hyperbolic or circular. Both methods require the MS to detect and process emissions from three distinct BTSs. In the hyperbolic method, time-of-arrival differences between BTS emissions, taking BTSs in pair-wise combinations, are measured at a location. A pair consists of a designated "reference" BTS and one neighbor BTS, from the reference cell's neighbor list. In some embodiments, for each reference BTS a list of base stations for which network assistance data has been compiled is obtained from a Serving Mobile Location Center (SMLC), and a neighbor cell for which such network assistance data is determined to be available is included in the pair. More than three BTSs can be used for increased accuracy, but to simplify the discussion, it will be assumed here that the MS uses a reference cell (ref) and two neighbor cells (nbr1 and nbr2) for OTD measurements. The MS then makes Observed Time Difference (OTD) measurements for the three selected base stations, taken as two pairs: OTD (ref, nbr1) and OTD (ref, nbr2).

However, the OTD measurements made at the MS are not sufficient to estimate the MS position. The macro-network base stations are not time-synchronized, causing the OTD measurement to include BTS time offsets, and not just the desired propagation delays required for geometry calculations. To achieve a posteriori cell synchronization, additional Radio Interface Timing (RIT) measurements are made at a Location Measurement Unit (LMU). Because the geographical locations of an LMU and macro-BTSs are known, the Real Time Differences (RTDs) can be derived. An RTD represents the time offset between emissions from two different base stations. The desired Geometric Time Difference (GTD), which is the time difference between the reception (by an MS) of bursts from two different base stations due to geometry, can be calculated as OTD-RTD. The necessary RTD values, along with a list of pairs of base stations and their geographical coordinates, are compiled into the E-OTD assistance data at a Serving Mobile Location Center (SMLC). An SMLC can be associated with one or more LMUs. The SMLC assistance data and the MS's OTD measurements must be combined to estimate the position of the MS. This calculation can be made either at the SMLC or the MS.

Using E-OTD or similar techniques to determine the location of a small scale or other potentially movable base station is disclosed. In some embodiments, a small scale or other potentially movable base station is configured to sense the local RF environment, for example by taking E-OTD measurements with respect to beacon and/or other broadcast signals transmitted by adjacent macro-BTS's. The E-OTD measures are used to determine a location of the small scale or other potentially movable base station relative to the adjacent macro-BTS's, and the precise geographic location of the small scale base station (e.g., latitude/longitude, street address) is determined based on the known location of the macro-BTS's.

Figure 4:
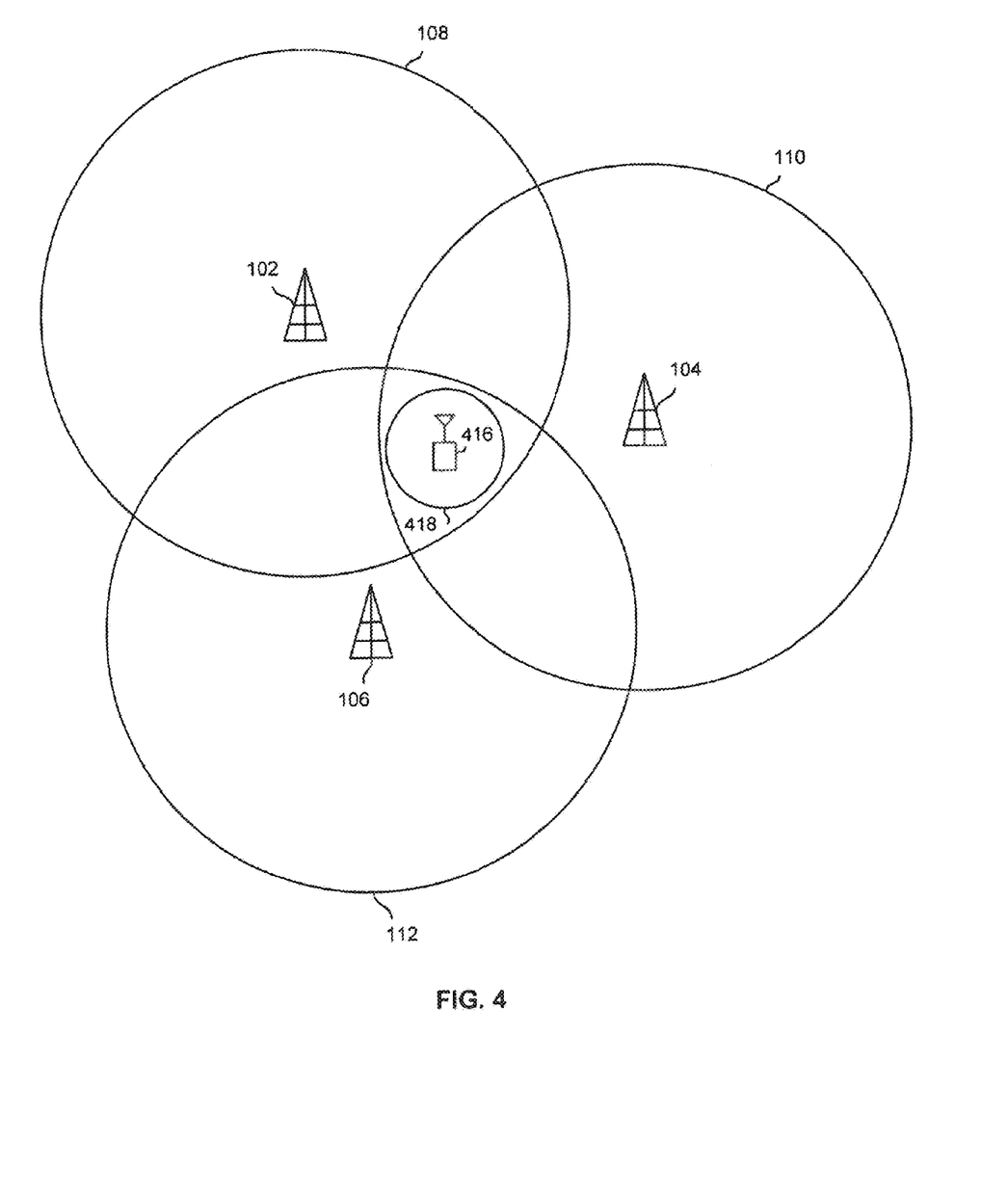
FIG. 4 is a block diagram illustrating an embodiment of a portion of a cellular network in which a small scale base station has been deployed.

FIG. 4 is a block diagram illustrating an embodiment of a portion of a cellular network in which a small scale base station has been deployed. Each of the macrocell base transceiver stations (BTS) 102, 104, and 106 has associated with it a corresponding geographic coverage area 108, 110, and 112, respectively, within which its signal is strong enough to be received and used by a mobile station (MS) to communicate with the core mobile telecommunication network via that BTS. In areas in which two or more coverage areas overlap, an MS could in theory communicate with the core mobile network via any BTS having coverage in that area. A small scale base station 416 having an associated coverage area 418 has been deployed, e.g., in a home or office, in a location such that the coverage area 418 overlaps (and in this example, for clarity of illustration, falls entirely within) the region in which respective coverage areas 108, 110, and 112 of BTSs 102, 104, and 106, respectively, overlap.

Figure 5:
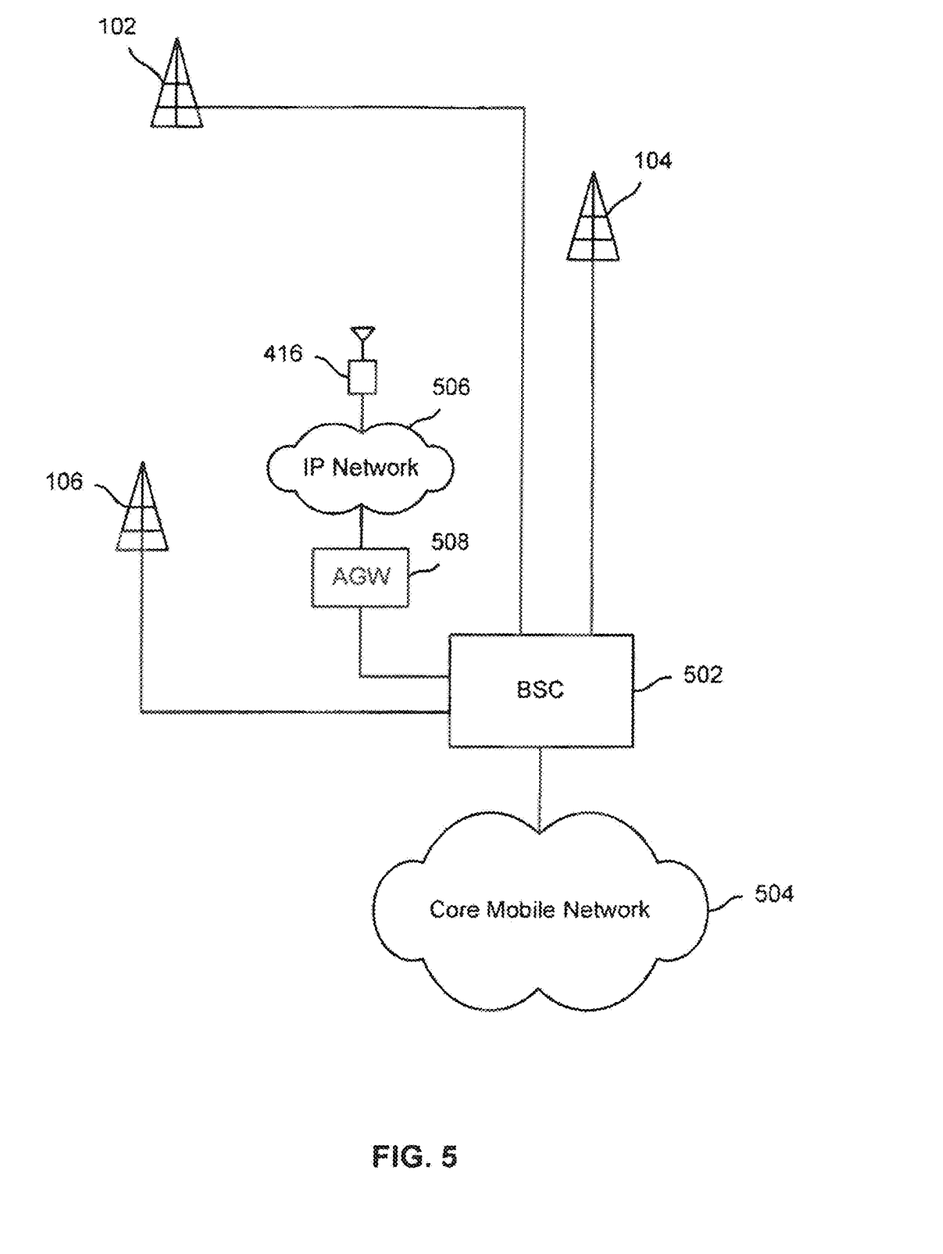
FIG. 5 is a block diagram illustrating an embodiment of a micro-, pico-, and/or femto-BTS or other small and/or potential movable base transceiver station with IP network backhaul.

FIG. 5 is a block diagram illustrating an embodiment of a micro-, pico-, and/or femto-BTS or other small and/or potential movable base transceiver station with IP network backhaul. In the example shown, macrocell BTS's 102, 104, and 106 communicate with the core mobile network 504 via a dedicated land line (e.g., T-1/E-1) to a BSC 502. The small scale BTS 416 is shown as being connected to BSC 502 via an IP network 506 and an aggregation gateway (AGW) 508. In some embodiments, AGW 508 is configured to support one or more small scale BTS's such as BTS 416, aggregating their traffic and translating traffic sent via the IP network 506 using a suitable protocol, e.g., the real-time transport protocol (RTP) for voice traffic, to the Abis (for GSM) or similar interface to the BSC 502 (or equivalent node in a non-GSM network), and vice versa. In some embodiments, a special SMLC is dedicated to a group of small scale base stations. In some embodiments, E-OTD or other location determining functions typically performed by an SMLC to determine the location of an MS are incorporated into the AGW 508. As high-speed Internet access for homes and small businesses becomes more and more ubiquitous, it has become and will continue to become more and more possible to deploy small scale base stations in homes and businesses, and use IP backhaul to provide connectivity to the core mobile network, avoiding the cost and waste of bandwidth that would attend if each such base station required a dedicated T-1/E-1 or other high capacity connection.

One challenge faced by mobile network providers in connection with deploying, operating, and monitoring small scale base stations such as BTS 416 in the examples shown in FIGS. 4 and 5 is that such small scale base stations may be small and light enough to be moved to a geographic location in which they are not authorized to be moved and/or from a specified geographic location in which they are intended and configured (e.g., provisioned) to be used. In the example shown in FIGS. 4 and 5, a small scale base station that it is physically possible to move could be moved and, absent countermeasures, deployed and used in any location having Internet access. For example, a small scale base station sold and intended for use in a home in one area could be resold and/or moved, without the network and/or service provider's permission, for use in another location. If not properly configured and/or authorized, such use in another location (e.g., another country, or out of the provider's service area) may violate government regulations, spectrum or other license and/or ownership rights of other providers, international telecommunications rules and agreements, the national or local laws of other countries, etc.; result in a loss of revenue and/or business opportunity, e.g., to sell or lease a base station to a second subscriber at the location to which the small scale base station has been moved; and/or facilitate a market for the sale and/or use of stolen base station equipment.

In addition, if the base station 416 were moved to an unknown location, it may not be possible for the mobile network and/or service provider to comply with E911 or other requirements and/or needs that require that the geographic location of the base station 416 be fixed or at least known. For example, if the base station 416 were moved to a location other than a registered location, the mobile network and/or service provider may not be able to determine accurately the geographic location of a mobile station (MS) used to place a 911 or other call via the base station 416.

GPS and other satellite based systems exist to determine and/or monitor geographic location, but such transceivers are expensive and require a clear view of the sky, which may not always be available with respect to a small scale base station deployed in a home (e.g., apartment), office, or other commercial building.

Therefore, extending the techniques described above as being used to determine the geographic location of a mobile station (MS) to determining the geographic location of a small scale base station or other potentially movable mobile network equipment is disclosed.

Figure 6:
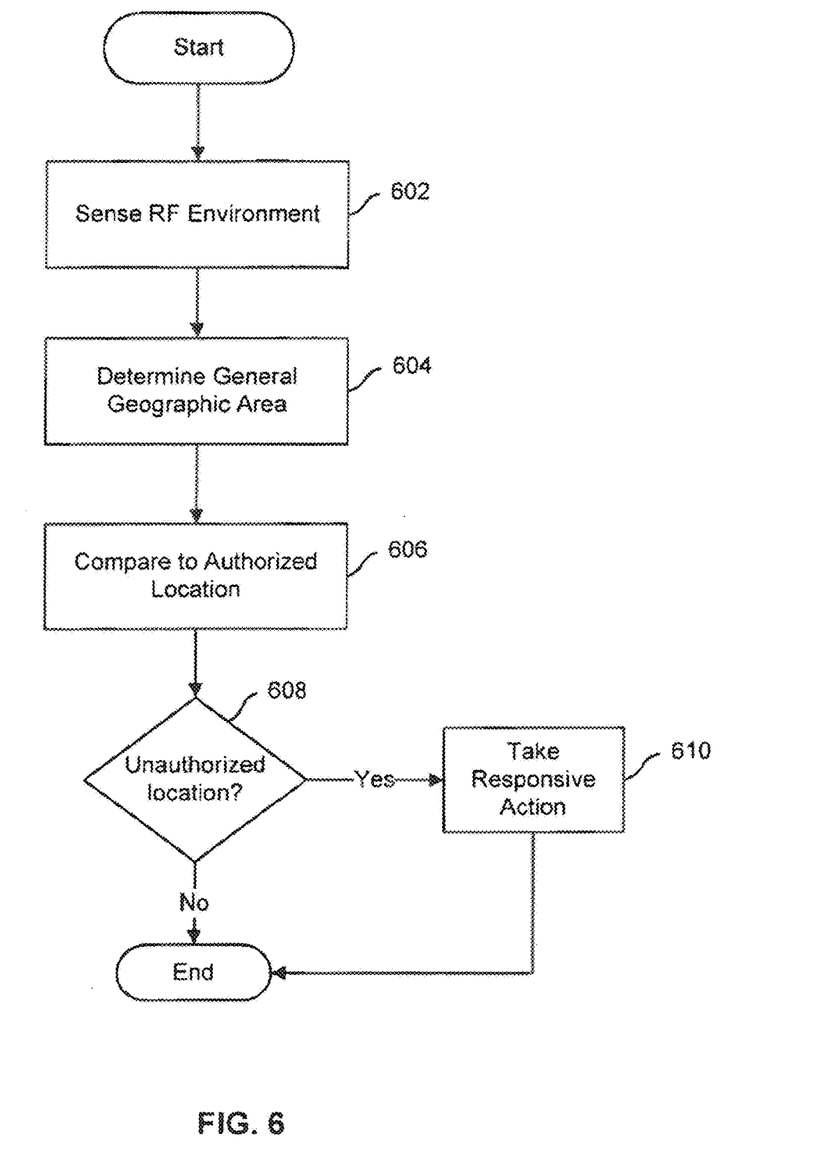
FIG. 6 is a flow chart illustrating an embodiment of a process for determining a general geographic location of a small scale base station or other potentially movable mobile network equipment.

FIG. 6 is a flow chart illustrating an embodiment of a process for determining a general geographic location of a small scale base station or other potentially movable mobile network equipment. In various embodiments, the process of FIG. 6 is implemented at least in part by a small scale base station or other potentially movable mobile network equipment and/or in part by another element, such as an element comprising and/or associated with the core mobile network. In the example shown, the local RF environment is sensed 602. Based at least in part on the sensed RF environment, a general geographic location of the base station or other equipment is determined 604. The location determined at 604 is compared to an authorized location of the base station or other equipment 606. If the comparison indicates the base station or other equipment has been moved to an unauthorized location 608, e.g., because the authorized location is not in the general area determined at 604, responsive action is taken 610. Examples of responsive action include shutting down the base station or other equipment, denying access to the core mobile network, and/or sending an alert.

Figure 7:
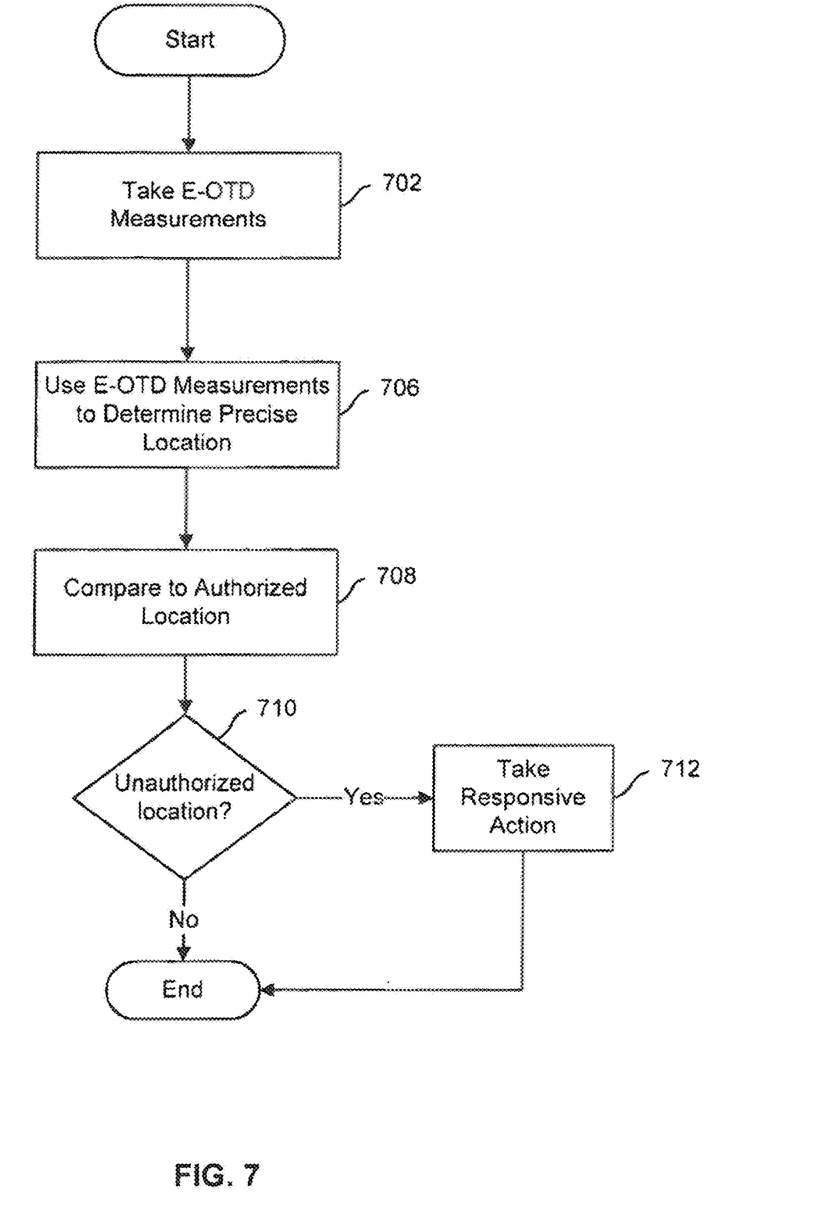
FIG. 7 is a flow chart illustrating an embodiment of a process for determining a geographic location of a small scale base station or other potentially movable mobile network equipment.

FIG. 7 is a flow chart illustrating an embodiment of a process for determining a geographic location of a small scale base station or other potentially movable mobile network equipment. In various embodiments, the process of FIG. 7 is implemented at least in part by a small scale base station or other potentially movable mobile network equipment and/or in part by another element, such as an element comprising and/or associated with the core mobile network. In the example shown, E-OTD (or similar) measurements are taken 702. The measurements taken at 702 and the known location of each respective macro-BTS are used to perform hyperbolic (or circular) lateralization to determine a (relatively) precise geographic location of the small scale base station or other equipment 706. The location determined at 706 is compared to an authorized location 708. If the location determined at 706 is not the (or a) location in which the small scale base station or other equipment is authorized to operate 710, responsive action is taken 712.

In some embodiments, 602-604 of FIG. 6 and/or 702-706 of FIG. 7 are used to determine (or verify) a current location of a small scale base station or other equipment, e.g., for purposes of using the determined (or verified) position of the base station to determine in turn a location of a mobile station (MS) or other equipment based at least in part on E-OTD or other measurements taken with respect to a beacon or other broadcast signal associated with the small scale base station or other equipment and/or to determine the general geographic location of an MS or other equipment that has sensed a beacon or other broadcast signal associated with the small scale base station or other equipment.

In some embodiments, the geographic location of a small scale base station is determined at least in part by prompting the small scale base station to transmit a signal burst and computing time differences in the arrival of the signal burst at one or more LMUs. A similar technique, known as Uplink Time Difference of Arrival (U-TDOA or U-TDoA) is used in some mobile networks to determine the geographic location of a mobile station (MS). U-TDOA is a method for location positioning of a Mobile Station (MS) that essentially operates in the reverse direction as compared to E-OTD, and requires no changes to be made to a handset or other mobile equipment. In E-OTD, downlink transmissions from at least three geographically distinct BTSs must be measured at the handset (or other equipment) in question. By contrast, in U-TDOA, uplink transmissions from the handset (or other equipment) must be measured by at least three geographically distinct network LMUs. The LMUs each measure an observed "time of arrival" (TOA) of the handset transmission bursts and forward their data to the SMLC. The SMLC calculates "Time Difference of Arrival" (TDOA) by pair-wise subtracting the TOA values. The SMLC also knows the geographical coordinates of the LMUs and the time offsets, if any, among LMU clocks. Using all of this data, the SMLC calculates the position of the handset.

The MS does not perform any unusual processing specific to U-TDOA during this procedure. If the MS was already in dedicated mode at the start of the location process, then the MS's TCH uplink bursts are measured at the LMUs. If the MS was in idle mode, then the MS is placed in dedicated mode by the MSC/BSC, specifically for location purposes, and either the SDCCH or TCH can be used for uplink transmission in that case.

Note that both U-TDOA and E-OTD employ an SMLC and multiple LMUs, and both use the hyperbolic positioning method.

In some embodiments, to support U-TDOA a small scale base station configured to transmit uplink bursts to the macro-network. The transmission power must be of sufficient strength for the necessary time-of-arrival measurements to be made at multiple network LMUs. In some embodiments, the small scale base station acts like a handset with respect to the macro-network—i.e., exchange signaling information to set up a call using specified physical channel parameters, and transmit uplink bursts on the SDCCH or TCH. In some alternative embodiments, a portion of the call setup signaling exchanges (prior to the SDCCH/TCH uplink bursts) are accomplished over proprietary interfaces via the Internet. In some embodiments, GSM (or other mobile) handset transceiver functionality is incorporated into the small scale base station. In some embodiments, a special SMLC is dedicated to a group of small scale base stations.

Figure 8:
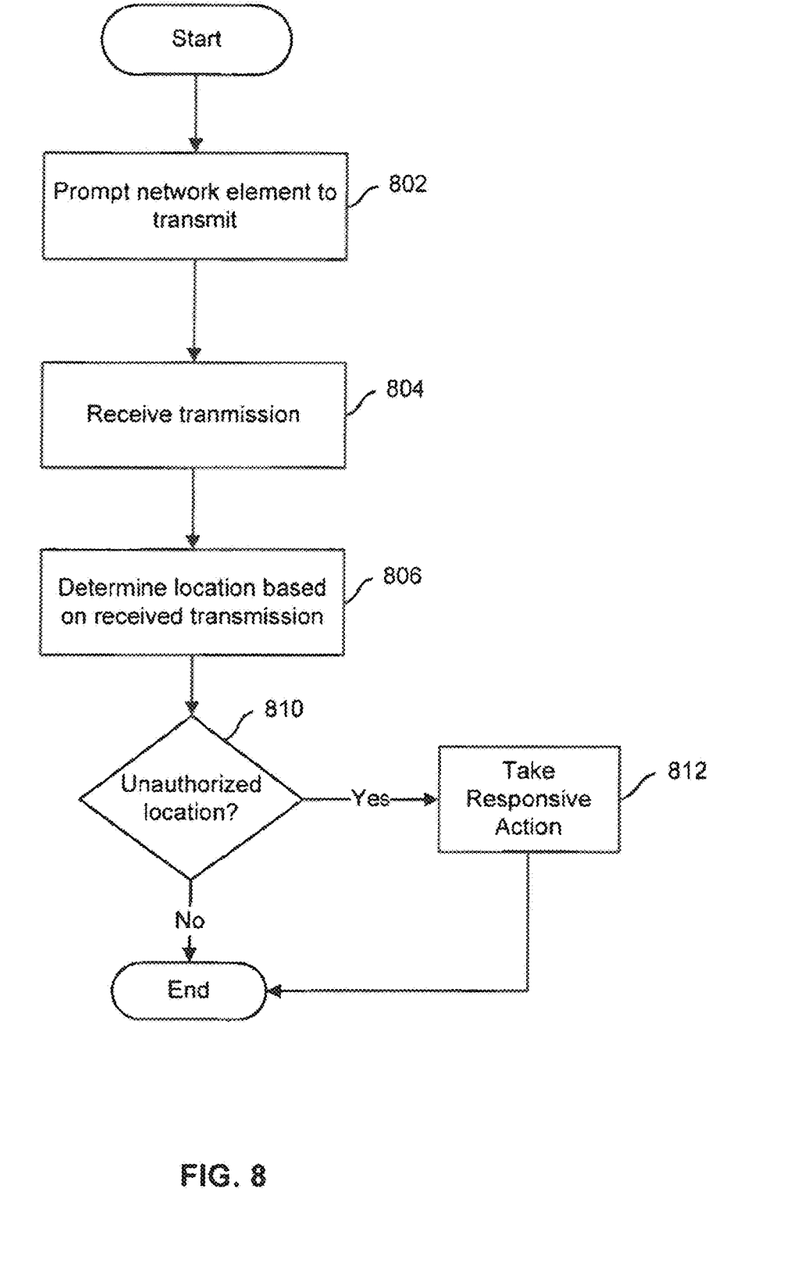
FIG. 8 is a flow chart illustrating an embodiment of a process for determining a geographic location of a small scale base station or other potentially movable mobile network equipment based on the time of arrival of a signal transmitted by the small scale base station.

FIG. 8 is a flow chart illustrating an embodiment of a process for determining a geographic location of a small scale base station or other potentially movable mobile network equipment based on the time of arrival of a signal transmitted by the small scale base station. The small scale base station (or other potentially movable network element) is prompted to transmit (802). The signal the small scale base station was prompted to transmit is received (804). In some embodiments, the signal is received at three or more LMUs. A location of the small scale base station is determined based on time or arrival of the received transmission, e.g., at the respective LMUs (806). In the example shown in FIG. 8, if the location determined at 806 is an unauthorized location (810), responsive action is taken (812); otherwise the process ends.

In some embodiments, the location of a small scale base station is determined by using uplink transmissions from one or more MSs being served by that base station, whether through normal uplink traffic bursts from an MS to the base station, or by forcing the MS into a temporary handover state to a macro-BTS (on that MS's neighbor cell list). The network LMUs detect these uplink transmissions, after being informed of the physical channel information by the SMLC in the normal way.

While a number of the examples described herein refer to GSM technologies, such as E-OTD and U-TDOA, in various embodiments other location determination techniques used previously to determine the location of a mobile equipment are applied to determine the location of a small scale base station or other mobile network equipment. For example, in a UMTS network, in various embodiments Observed Time Difference of Arrival (OTDOA) and/or other techniques defined and/or supported by applicable standards are used.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of determining a geographic location of a mobile station, the method comprising:
    querying, by the mobile station, a serving mobile location center (SMLC) to determine a reference macro-base transceiver station (macro-BTS) and a neighbor macro-BTS of the reference macro-BTS;
    receiving a plurality of beacons at the mobile station including a first beacon transmitted by the reference macro-BTS and a second beacon transmitted by the neighbor macro-BTS;
    determining, by the mobile station, a set of measurement data that includes, for each of the plurality of beacons received at the mobile station, a corresponding measurement data; and
    performing, by the mobile station, location based calculations using the set of measurement data to determine the geographic location of the mobile station.

2. The method as recited in claim 1, wherein the set of measurement data further comprises, for each received beacon, a time of arrival.

3. The method as recited in claim 1, wherein performing location based calculations using the set of measurement data to determine the geographic location of the mobile station comprises performing Enhanced Observed Time Different (E-OTD) computations.

4. The method as recited in claim 1, further comprising determining a location of the mobile station, to a first order, using the plurality of beacons received at the mobile station.

5. The method as recited in claim 1, wherein the set of measurement data includes, for each of a plurality of pairs of macro-BTSs, a difference between a first time of arrival of a first beacon transmitted by a first macro-BTS included within a first pair and a second time of arrival of a second beacon transmitted by a second macro-BTS included within the first pair.

6. The method as recited in claim 5, wherein the set of measurement data further comprises a geographic location of the first macro-BTS and a geographic location of the second macro-BTS.

7. The method as recited in claim 2, wherein the corresponding measurement data includes a real time difference (RTD) between the first beacon transmitted by the reference macro-BTS and the second beacon transmitted by the neighbor macro-BTS.

8. The method as recited in claim 1, further comprising comparing the determined geographic location to an authorized geographic location, and taking responsive action if the determined geographic location is different than the authorized geographic location.

9. The method as recited in claim 1, wherein querying the SMLC includes determining a second neighbor macro-BTS of the reference macro-BTS, and wherein the plurality of beacons received at the mobile station includes a third beacon transmitted by the second neighbor macro-BTS.

10. The method as recited in claim 1, further comprising determining, by the mobile station, a geographic location of a small scale base station based on the determined geographic location of the mobile station.

11. A method of determining a geographic location of a mobile station, the method comprising:
    querying, by the mobile station, a serving mobile location center (SMLC) to determine a reference macro-base transceiver station (macro-BTS) and a neighbor macro-BTS of the reference macro-BTS;
    receiving a plurality of beacons at the mobile station including a first beacon transmitted by the reference macro-BTS and a second beacon transmitted by the neighbor macro-BTS;
    determining, by the mobile station, a time of arrival, and corresponding assistance data, for each of the plurality of beacons received at the mobile station; and
    performing, by the mobile station, location based calculations using the time of arrival, and corresponding assistance data, for each of the plurality of beacons received at the mobile station to determine the geographic location of the mobile station.

12. The method as recited in claim 11, wherein querying the SMLC includes determining a second neighbor macro-BTS of the reference macro-BTS, and wherein the plurality of beacons received at the mobile station includes a third beacon transmitted by the second neighbor macro-BTS.

13. The method as recited in claim 11, further comprising determining, by the mobile station, a geographic location of a small scale base station based on the determined geographic location of the mobile station.

14. A system for determining a geographic location of a mobile station, the system comprising:
a radio frequency receiver; and
a processor configured to:
query a serving mobile location center (SMLC) to determine a reference macro-base transceiver station (macro-BTS) and a neighbor macro-BTS of the reference macro-BTS;
receive a plurality of beacons including a first beacon transmitted by the reference macro-BTS and a second beacon transmitted by the neighbor macro-BTS;
determine a time of arrival, and corresponding assistance data, for each of the plurality of received beacons; and
use the time of arrival, and corresponding assistance data, for each of the plurality of received beacons to determine the geographic location of the mobile station.

15. The system as recited in claim 14, further comprising a communication interface coupled to the processor and wherein the processor is further configured to report to a core mobile network element via the communication interface the time of arrival, and corresponding assistance data, for each of the plurality of received beacons.

16. The system as recited in claim 14, wherein the radio frequency receiver and the processor are included in the mobile station.

17. A system for determining a geographic location of a mobile station, the system comprising:
a communication interface; and
a processor configured to:
query a serving mobile location center (SMLC) to determine a reference macro-base transceiver station (macro-BTS) and a neighbor macro-BTS of the reference macro-BTS;
receive a plurality of beacons including a first beacon transmitted by the reference macro-BTS and a second beacon transmitted by the neighbor macro-BTS;
receive via the communication interface a set of measurement data that includes, for each of the plurality of received beacons, a corresponding measurement data; and
use the set of measurement data by performing location based calculations to determine the geographic location of the mobile station.

18. A method of determining a geographic location of a mobile station, the method comprising:
determining, by a serving mobile location center (SMLC), a reference location measurement unit (LMU) and a neighbor LMU of the reference LMU;
receiving, at the SMLC, a first time of arrival (TOA) measurement from the reference LMU and a second TOA measurement from the neighbor LMU,
wherein the first TOA measurement corresponds to a plurality of beacons received at the reference LMU, from the mobile station, and the second TOA measurement corresponds to a plurality of beacons received at the neighbor LMU, from the mobile station;
determining, by the SMLC, a first time difference of arrival (TDOA) measurement corresponding to a difference between the first TOA measurement and the second TOA measurement; and
performing location based calculations at the SMLC using the first TDOA measurement to determine the geographic location of the mobile station.

19. The method as recited in claim 18, further comprising:
determining, by the SMLC, a second neighbor LMU of the reference LMU;
receiving, at the SMLC, a third TOA measurement from the second neighbor LMU, wherein the third TOA measurement corresponds to a plurality of beacons received at the second neighbor LMU, from the mobile station;
determining, by the SMLC, a second TDOA measurement corresponding to a difference between the first TOA measurement and the third TOA measurement; and
performing location based calculations at the SMLC using the second TDOA measurement to determine the geographic location of the mobile station.

20. The method as recited in claim 19, wherein determining the first and second TDOA measurements further comprises performing Uplink Time Difference of Arrival (U-TDOA) computations based on the first, second and third TOA measurements.

21. The method as recited in claim 18, wherein the plurality of beacons are received at the reference LMU and the neighbor LMU after the mobile station is forced into a temporary handover state to a macro-base transceiver station (macro-BTS).

22. The method as recited in claim 1, where the geographic location of the mobile station is one or more geographic coordinates.

23. The method as recited in claim 1, wherein the geographic location of the mobile station is a street address.

24. The method as recited in claim 11, where the geographic location of the mobile station is one or more geographic coordinates.

25. The method as recited in claim 11, wherein the geographic location of the mobile station is a street address.

26. The method as recited in claim 18, where the geographic location of the mobile station is one or more geographic coordinates.

27. The method as recited in claim 18, wherein the geographic location of the mobile station is a street address.

28. The method as recited in claim 8, wherein the responsive action includes a shutdown of the mobile station, a denial of access to a core mobile network by the mobile station, or receiving an alert at the mobile station.

* * * * *